United States Patent Office 2,976,212
Patented Mar. 21, 1961

2,976,212

HYALURONIDASE WITH HEPARIN OR HEPARIN-OIDS IN OINTMENT COMPOSITIONS

Hermann Friedrich and Rudolf Gosswald, Wuppertal-Elberfeld, Germany, assignors to Schenley Industries, Inc., New York, N.Y., a corporation of Delaware No Drawing. Filed Nov. 25, 1957, Ser. No. 698,353

Claims priority, application Germany Dec. 1, 1956

8 Claims. (Cl. 167—63)

The present invention relates to therapeutic ointments and more particularly to stable ointment compositions comprising an anhydrous paraffinic ointment base containing both hyaluronidase and heparin or a heparinoid.

After the discovery of the enzyme hyaluronidase and its specific decomposing effect on hyaluronic acid and connective tissue containing this acid, the hyaluronidase was utilized therapeutically by adding it to medicaments to speed the absorpton of the medicaments. Inasmuch as the enzyme is not stable in aqueous solutions, it had to be stabilized by freeze-drying and dissolved just prior to use and then added to the pharmaceutical agent to be injected. Ointments for external use are also known which contain hyaluronidase in an aqueous or anhydrous form, but in the aqueous form the stability of the enzyme is not assured. Medicaments or pharmaceutical agents which have been used with hyaluronidase are, for example, the sulfonamides, various antibiotics and local anesthetics.

It has recently been suggested that ointments containing heparinoids can be applied percutaneously for the treatment of superficial thromboses, these heparinoids being obtained by the sulfatization of polysaccharides and of polysaccharide-containing starting materials, as described, for example, in German Patent No. 967,153 for the cellular substance of fungi.

Ointments containing heparin or a heparinoid in combination with hyaluronidase in stable form are not known. German Patent No. 926,085 describes a treatment of heparin or of heparinoid mucopolysaccharide acids with hyaluronidase in aqueous form for the ostensible purpose of increasing the inhibitory activity of the heparin, but prolonged treatment therewith not only nullifies this activation, but in addition abolishes the anti-coagulant effect of the substrate due to the fact that the heparin is then inactivated by the hyaluronidase. For this reason, it becomes necessary after a period of time to destroy the activity of the hyaluronidase by heat. It is therefore apparent that according to this German patent, mixtures are used in aqueous solution in which neither the hyaluronidase nor the heparin effect is stable.

We have discovered that stable ointments containing hyaluronidase in combination with heparin or a heparinoid can be prepared, provided the two components are incorporated into an anhydrous ointment base. It has further been found that in addition to the advantage of stability, the new ointments also exert a stronger effect on blood coagulation than heparin or heparinoid ointments containing no hyaluronidase.

Available data concerning the effect of hyaluronidase on blood coagulation are very contradictory. Kaliampetsos (Klin. Wschr. 34:438 (1956)) attributes to the enzyme a hemostatic effect due to liberation of thrombokinase, while other authors such as Fiala and Meranze (Science, 115:600 (1952)) report that hyaluronidase delays coagulation of blood. It therefore cannot be at all predicted on the basis of existing knowledge whether and how hyaluronidase would act in an anhydrous ointment with heparin or a heparinoid, especially since no such combination has previously been known or described.

Since heparin-type substances are considered to be inhibitors for hyaluronidase, it would be expected that those substances would block hyaluronidase action. We have observed, however, that the addition of hyaluronidase to an anhydrous ointment base containing heparin or a heparinoid definitely intensifies the anti-coagulant effect and that this effect persists. This was most surprising and unexpected.

The prolongation of clotting time, for example, by a heparinoid ointment can be demonstrated by rubbing the ointment into the dorsal skin or internal ear surface of rabbits and by determining several hours later the recalcification time of the blood of the experimental animal, i.e. the clotting time of the plasma following addition of calcium chloride. Considerable prolongation is effected. When the ointment contains hyaluronidase in addition to heparin or a heparinoid, the increase in recalcification time becomes even more significant and the therapeutic blood level is maintained for a longer period of time. This can be demonstrated by applying one gram of the ointment to the internal surface of the ear of each of ten rabbits. The recalcification time is determined before application of the ointment and one, two, four and six hours after application. A heparinoid ointment shows a marked anticoagulant effect from the first to the fourth hour and in the case of the heparinoid-hyaluronidase ointment, the anti-coagulant effect was 50% greater and remained demonstrable for at least six hours. When a heparinoid ointment is applied to the abdominal skin of guinea pigs and coagulation is traced by means of a thrombo-elastograph, the thrombo-elastogram of blood withdrawn after two hours shows a definite extension of the reaction and clotting time. When hyaluronidase is added to the heparinoid ointment, the effect is doubled.

As stated above, our new ointments comprise an anhydrous ointment base with which is incorporated the hyaluronidase and heparin or a heparinoid. We have found that the ointment base may be of any known or suitable nature so long as it is anhydrous and so long as it is free of components such as acid- or basic-reacting substances which are incompatible with or harmful to hyaluronidase or anti-coagulants. Heparin may be used as such or a heparinoid may be employed, including all anti-coagulant substances prepared by sulfatization of polysaccharide or pollysaccharide-containing starting materials, as described, for example, in the aforesaid German Patent No. 967,153 for the cellular substance of fungi. The amount of heparin or heparinoid substance in our ointment ranges from 0.1% to 2% and may be somewhat below or above this designated range. The amount of hyaluronidase in our ointment ranges from 0.1% to 1.0%. These percentages are by weight calculated on the weight of the ointment base which may, for example, be eucerin, paraffin, or a mixture thereof. Eucerin is a fatty substance consisting of paraffin and wool-fat constituents. The heparin may be obtained in known manner from the liver or lung of cattle. A heparinoid is generally preferable because of its lesser expense as compared with heparin. Hyaluronidase is the enzyme obtained in known manner from bull testes and it is essential that all components of the ointment be sterile and anhydrous. Ointments in accordance with the invention have excellent stability and do not decompose, as evidenced by the fact that the individual components can be recovered by extraction from ointments which have been in storage for a considerable time.

The invention is illustrated by the following non-limitative examples:

EXAMPLE I

A mixture is prepared from 840 grams of sterile anhydrous eucerin and 140 grams of sterile liquid paraffin. The mixture of eucerin and paraffin is ground with 5 grams of a heparinoid obtained by sulfatization of waste mycelium from penicillin production according to German Patent No. 967,153 and with 10 grams of hyaluronidase obtained by freeze-drying. The entire mixture is thoroughly homogenized and then filled into tubes.

In analogous manner, a hyaluronidase ointment containing heparin extracted from the lung can be prepared.

EXAMPLE II

Cellulose is converted into a blood anti-coagulant by sulfating with chlorosulfonic acid in pyridine by the method described by Chargaff, Bancroft and Stanley-Brown (Journal Biological Chemistry, 115, 155 (1956)). 5 grams of this heparinoid and 1 gram of hyaluronidase derived from bull testes are intimately mixed with 1,000 grams of a paraffin ointment base to form the completed ointment.

EXAMPLE III 5 grams of a heparin-like substance obtained by the conversion of pectin with chlorosulfonic acid in pyridine corresponding to the method described by Bergstrom, Hoppe-Seylers (Zeitschrift für physiologische Chemie 238, 163 (1936)) and 10 grams of hyaluronidase are intimately mixed with 1,000 grams of a eucerin-paraffin ointment base and homogenized to yield an anhydrous ointment.

Pharmacological findings

Ointments according to the present invention represent a new type of anti-thrombotic ointment containing not only an active substance of the heparinoid type extracted from biological material, but also the enzyme hyaluronidase obtained from bull testes in a tolerable and stable form. The heparinoid substance of the ointment is absorbed through the skin and maintains a heparinemia for some considerable period of time, as a result of which the coagulation time of the blood is extended. The hyaluronidase supplements and promotes the heparinoid action in several ways. The action of hyaluronidase in breaking down the connective tissue, particularly the cementing mucoid hyaluronic acid, permits rapid penetration of the heparinoid and the combination of hyaluronidase and heparinoid causes a prolongation of clotting time in guinea pigs and rabbits, which goes materially beyond the individual effect of the heparinoid component. In this way, the permeability-increasing action of hyaluronidase is manifested.

The literature reports that subcutaneous injections of hyaluronidase have a healing effect in ulcus cruris. This characteristic effect and the promotion of absorption due to hyaluronidase in conjunction with the heparinoid action permit a highly effective treatment of thrombotic and varicose cutaneous and vascular diseases.

Experimental toxicity work has shown that the $LD_{50}$ of the intravenously injected heparinoid substance is 300 mg. per kilogram for the white mouse. To demonstrate inhibition of coagulation in vitro, the in vitro blood coagulation test was carried out according to Fischer (Arch. f.d. ges. Phys. 225:737 (1930)). Blood was taken from the carotid of the rabbit and diluted with physiological saline and the test solution. With a final concentration of the heparinoid of 0.1% and 0.02% respectively, the blood had not coagulated after one hour. Only with a 0.002% solution did coagulation occur within twenty minutes. Control samples coagulated within six to eight minutes.

Inhibition of coagulation in vivo was carried out by applying one gram of ointment to the inside of a rabbit ear and determining recalcification time according to Pichotka and Mayer (Arzneimittel-Forschung 4:277 (1954)). The recalcification time is considerably prolonged after only two hours, the effect of a heparinoid ointment of equal concentration without the added absorption-promoting enzyme being approximately doubled. Use of the ointment of the invention maintains a therapeutic level for at least four hours.

In guinea pigs, one gram of ointment was applied to the depilated abdominal skin. Two or four hours later the recalcification time was determined by thromboelastograph according to H. Hartert (Klin. Wschr. 1948:577) in the plasma of blood from the jugular vein. The following values were the average of seven animals:

| Preparation | Reaction Time | | | Coagulation Time | | |
| --- | --- | --- | --- | --- | --- | --- |
| | Before | 2 hrs. | 4 hrs. | Before | 2 hrs. | 4 hrs. |
| | | After Application | | | After Application | |
| Heparinoid Ointment without hyaluronidase | 5±0.3' | 6±0.8' | 11±2' | 8±0.8' | 14±4' | 34±5' |
| With hyaluronidase | 5±0.3' | 17±3' | 14±0.3' | 8±0.8' | 60±3' | >1 hr. |

The guinea pig findings confirm the results obtained in rabbits and show the effect of the presence of the hyaluronidase even more clearly.

The new ointment has good local tolerance as was shown, for example, by rubbing one gram of the ointment into the skin of the upper arm of five subjects. No symptoms of irritation appeared within twenty-four hours. The new ointment is indicated for use in phlebitis, ulcus cruris, superficial thrombosis, hematoma, varicose syndrome and hemorrhoids. The ointment is used by applying it to the diseased area or to the area to be treated as a rope of ointment 3–5 cm. long or on a gauze compress two to three times daily. Treatment with the ointment is continued until the symptoms subside. Use of the ointment is, however, contra-indicated in hemorrhages and purulent processes. For the latter type of case, the product is applied in a place remote from the site of infection.

Application of the ointment of the invention in a number of clinical trials has shown generally favorable results in the treatment of various disease conditions referred to above.

In cases of severe ulcera cruris, the ointment produced, in addition, an analgesic effect.

The ointment used in the clinical trials was "Bayer B 165," which is well absorbed through the skin and contains, in addition to an anhydrous ointment base, an active substance of the heparinoid type extracted from biological material and the enzyme hyaluronidase (Luronase "Bayer") obtained from bull testes in a tolerable and stable form.

The invention is defined by the appended claims.

What is claimed is:

1. A stable ointment comprising an anhydrous sterile ointment base containing about 0.1% to 1.0% of hyaluronidase and about 0.1% to 2% of a member of the group consisting of heparin and an anti-coagulant sulfated polysaccharide, calculated on the weight of the ointment base.

2. An ointment according to claim 1, in which the ointment base is paraffinic.

3. An ointment according to claim 1, in which the group member is heparin.

4. An ointment according to claim 1, in which the group member is an anti-coagulant sulfated polysaccharide.

5. An ointment according to claim 4, in which the anti-coagulant sulfated polysaccharide is obtained by sulfatization of waste mycelium from penicillin production.

6. A stable anhydrous ointment comprising a homogenized mixture of the following constituents in approximately the following proportions:

| | Grams |
|---|---|
| Paraffin-wool-fat constituents | 840 |
| Paraffin | 140 |
| Anti-coagulant sulfated polysaccharide | 5 |
| Hyaluronidase | 10 |

7. A stable anhydrous ointment comprising a homogenized mixture of the following constituents in approximately the following proportions:

| | Grams |
|---|---|
| Paraffin | 1,000 |
| Anti-coagulant sulfated polysaccharide | 5 |
| Hyaluronidase | 1 |

8. A stable anhydrous ointment comprising a homogenized mixture of the following constituents in approximately the following proportions:

| | Grams |
|---|---|
| Paraffin-wool-fat constituents—paraffin mixture | 1,000 |
| Heparin | 5 |
| Hyaluronidase | 10 |

References Cited in the file of this patent

FOREIGN PATENTS

| | | |
|---|---|---|
| 926,085 | Germany | Apr. 7, 1955 |
| 967,153 | Germany | Oct. 10, 1957 |

OTHER REFERENCES

Schwartzman: Clin. Med., 61:6, June 1954, pp. 469–472.

Harry: Modern Cosmeticology, 4th ed., vol. 1, 1955, pp. 83–87, 176–180, Leonard Hill Ltd., London.

Pichotka: Chem. Absts., vol. 48, 1954, p. 8960d (Arzneimittel-Forsch. 4:277, 1954).

Spier: Surgery, Gyn. and Obstetrics, 98:6, June 1954, pp. 667–669, 671, 672, 674.